(12) United States Patent
Barnett

(10) Patent No.: US 11,317,134 B1
(45) Date of Patent: Apr. 26, 2022

(54) SYSTEM AND METHOD FOR DYNAMICALLY SWITCHING AMONG SOURCES OF VIDEO CONTENT

(71) Applicant: SWFY LLC, Melbourne, FL (US)

(72) Inventor: Nathan R. Barnett, Melbourne, FL (US)

(73) Assignee: SWFY, LLC, Melbourne, FL (US)

( * ) Notice: Subject to any disclaimer, the term of this patent is extended or adjusted under 35 U.S.C. 154(b) by 511 days.

(21) Appl. No.: 14/851,978

(22) Filed: Sep. 11, 2015

Related U.S. Application Data

(60) Provisional application No. 62/048,934, filed on Sep. 11, 2014.

(51) Int. Cl.
| | |
|---|---|
| *H04N 21/2665* | (2011.01) |
| *H04N 7/173* | (2011.01) |
| *H04N 21/234* | (2011.01) |
| *H04N 21/2365* | (2011.01) |
| *H04N 21/231* | (2011.01) |
| *H04N 21/462* | (2011.01) |
| *H04N 21/845* | (2011.01) |
| *H04N 21/24* | (2011.01) |

(52) U.S. Cl.
CPC ..... *H04N 21/2665* (2013.01); *H04N 7/17318* (2013.01); *H04N 21/2365* (2013.01); *H04N 21/23103* (2013.01); *H04N 21/23406* (2013.01); *H04N 21/23424* (2013.01); *H04N 21/2402* (2013.01); *H04N 21/4622* (2013.01); *H04N 21/8456* (2013.01)

(58) Field of Classification Search
CPC ......... H04N 21/2665; H04N 21/23103; H04N 21/23406; H04N 21/23424; H04N 21/2365; H04N 21/2402; H04N 21/4622; H04N 21/8456; H04N 7/17318
See application file for complete search history.

(56) References Cited

U.S. PATENT DOCUMENTS

| | | | |
|---|---|---|---|
| 6,868,452 B1 * | 3/2005 | Eager | H04N 21/23106 709/231 |
| 7,080,400 B1 * | 7/2006 | Navar | H04N 7/17336 348/E7.073 |
| 7,404,201 B2 * | 7/2008 | Takeuchi | G06F 17/3089 348/E7.073 |

(Continued)

*Primary Examiner* — An Son P Huynh
(74) *Attorney, Agent, or Firm* — Daniel C. Pierron; Widerman Malek, PL

(57) ABSTRACT

A system for creating video content from two or more video content segments has a first video content source storing the video content as two or more video content segments. A second video content source stores the video content as two or more video content segments. A content requestor selects a source of a video content segment in response to an end user request. The selection is made as a function of one or more characteristics of transmission of the video content segment from a selected video content source to the end user. The content requestor monitors the video content segments transmitted by a selected video content source to determine whether a value for the video content characteristic has changed, and determines whether the video content source for a second video content segment source is to be changed from the video content source of the video content segment as a function of the change in the characteristic.

15 Claims, 3 Drawing Sheets

(56) References Cited

U.S. PATENT DOCUMENTS

| | | | |
|---|---|---|---|
| 7,761,900 B2* | 7/2010 | Crayford | H04N 7/17318 709/223 |
| 8,191,095 B2* | 5/2012 | Briggs | H04L 12/2801 725/109 |
| 8,631,143 B2* | 1/2014 | Simonds | H04N 21/21805 709/225 |
| 8,904,463 B2* | 12/2014 | Shankar | H04N 7/17354 709/204 |
| 9,113,182 B2 | 8/2015 | Lemmons | |
| 9,491,504 B1* | 11/2016 | Nijim | H04N 21/4383 |
| 9,684,716 B2* | 6/2017 | McConville | G06F 17/30846 |
| 2002/0059394 A1* | 5/2002 | Sanders | H04N 7/17336 709/217 |
| 2002/0124262 A1* | 9/2002 | Basso | H04N 7/17336 725/109 |
| 2002/0157103 A1* | 10/2002 | Song | H04N 7/17318 725/97 |
| 2002/0174430 A1* | 11/2002 | Ellis | H04N 5/44543 725/46 |
| 2003/0204856 A1* | 10/2003 | Buxton | H04N 7/17318 725/120 |
| 2006/0236245 A1* | 10/2006 | Agarwal | G11B 27/034 715/716 |
| 2007/0154163 A1* | 7/2007 | Cordray | H04N 5/782 386/278 |
| 2007/0157281 A1* | 7/2007 | Ellis | H04N 7/17309 725/134 |
| 2008/0141317 A1* | 6/2008 | Radloff | H04N 5/44582 725/87 |
| 2008/0205394 A1* | 8/2008 | Deshpande | H04L 12/185 370/390 |
| 2009/0063681 A1* | 3/2009 | Ramakrishnan | H04N 7/17318 709/225 |
| 2009/0083412 A1* | 3/2009 | Olaiya | H04L 65/1083 709/224 |
| 2009/0217326 A1* | 8/2009 | Hasek | H04N 7/17336 725/87 |
| 2009/0310494 A1* | 12/2009 | Ou | H04L 41/06 370/252 |
| 2010/0031162 A1* | 2/2010 | Wiser | G06Q 30/0255 715/747 |
| 2010/0058405 A1* | 3/2010 | Ramakrishnan | H04N 7/17318 725/97 |
| 2010/0153885 A1* | 6/2010 | Yates | G06F 3/0482 715/841 |
| 2010/0178024 A1* | 7/2010 | Agarwal | G11B 27/034 386/278 |
| 2011/0078717 A1* | 3/2011 | Drummond | H04N 21/4586 725/14 |
| 2012/0047542 A1* | 2/2012 | Lewis | H04N 21/44016 725/97 |
| 2012/0129476 A1* | 5/2012 | Whikehart | H04B 1/082 455/179.1 |
| 2012/0137336 A1* | 5/2012 | Applegate | H04N 21/2225 725/95 |
| 2012/0158985 A1* | 6/2012 | Patten | H04L 65/608 709/231 |
| 2012/0257560 A1* | 10/2012 | Srinivasan | H04W 4/18 370/312 |
| 2013/0064283 A1* | 3/2013 | Sun | H04N 21/2343 375/240.01 |
| 2013/0104175 A1* | 4/2013 | Applegate | H04N 21/231 725/87 |
| 2014/0003799 A1* | 1/2014 | Soroushian | H04N 9/8227 386/353 |
| 2014/0007146 A1* | 1/2014 | Peterson | H04N 21/2543 725/5 |
| 2014/0129618 A1* | 5/2014 | Panje | H04N 21/26258 709/203 |
| 2014/0269401 A1* | 9/2014 | Gondi | H04L 43/0876 370/253 |
| 2014/0280781 A1* | 9/2014 | Gregotski | H04L 65/60 709/219 |
| 2014/0280906 A1* | 9/2014 | Johns | H04L 45/28 709/224 |
| 2014/0282792 A1* | 9/2014 | Bao | H04N 21/44004 725/116 |
| 2014/0344852 A1* | 11/2014 | Reisner | H04N 21/2668 725/32 |
| 2015/0019968 A1* | 1/2015 | Roberts | G11B 27/28 715/719 |
| 2015/0067722 A1* | 3/2015 | Bjordammen | H04N 21/2625 725/32 |

* cited by examiner

SYSTEM AND METHOD FOR DYNAMICALLY SWITCHING AMONG SOURCES OF VIDEO CONTENT

CROSS REFERENCE TO RELATED APPLICATION

This application claims priority from Provisional Patent Application No. 62/048,934 filed Sep. 11, 2014, and is incorporated herein as set forth in its entirety.

BACKGROUND OF THE INVENTION

This invention is directed to a system and method for presenting a single video constructed from one or more video sources; and more particularly, for providing a single video content in which portions of the video content maybe sourced from different content sources as a function of desired characteristics of the source itself.

As known in the art, users upload video content from sources throughout the Internet system. "Online" video streaming utilizes, a single content source for a desired content to be viewed without regard to factors that might influence the availability, and use of that single source. These prior art video systems streamed content from a single source or a selection of sources without regard to factors such as display quality, costs, speed, and availability. These prior art systems suffer from the disadvantage that they were unable to make intelligent decisions with respect to content loading from sources based on both a.) supplied parameters in selecting the source, as well as, b.) real time dynamic parameters, existing during the streaming of the video content. These prior art systems suffered from the disadvantage that they were unable to adapt, or change the source, during online video streaming if the cost, quality or speed of the video source suddenly changed during the streaming of the video. This resulted in a decrease in satisfaction by both the end user as well as the content provider.

Therefore, a system and methodology which overcomes the shortcomings of the prior art is desired.

BRIEF SUMMARY OF THE INVENTION

A video content requestor receives video content from two or more sources. The content requestor selects a video content source from two or more video content sources as a function of multiple factors of the two or more video content sources including the performance of the content source as transmitted to an end user viewer's computer. This optimizes the viewer experience as well as other factors such as reducing costs for serving the content. The content requestor takes into account one or more factors when choosing sources as well as adaptively using different sources for different segments of the video being streamed, all as a function of each of those characteristics. The present requestor improves upon the prior art by determining for one of more factors when choosing content sources, as well as adaptively using different sources as a function of change in each factor for each source for different segments of the video. The system switches between different content sources while video is streaming to optimize source selection based on parameters such as costs, quality, speed, and network conditions.

BRIEF DESCRIPTION OF THE DRAWINGS

The present disclosure will be better understood by reading the written description with reference to the accompanying drawings and figures in which the reference numerals denote the similar structure and refer to like elements throughout, in which.

DETAILED DESCRIPTION OF THE PREFERRED EMBODIMENT

Figure 1:
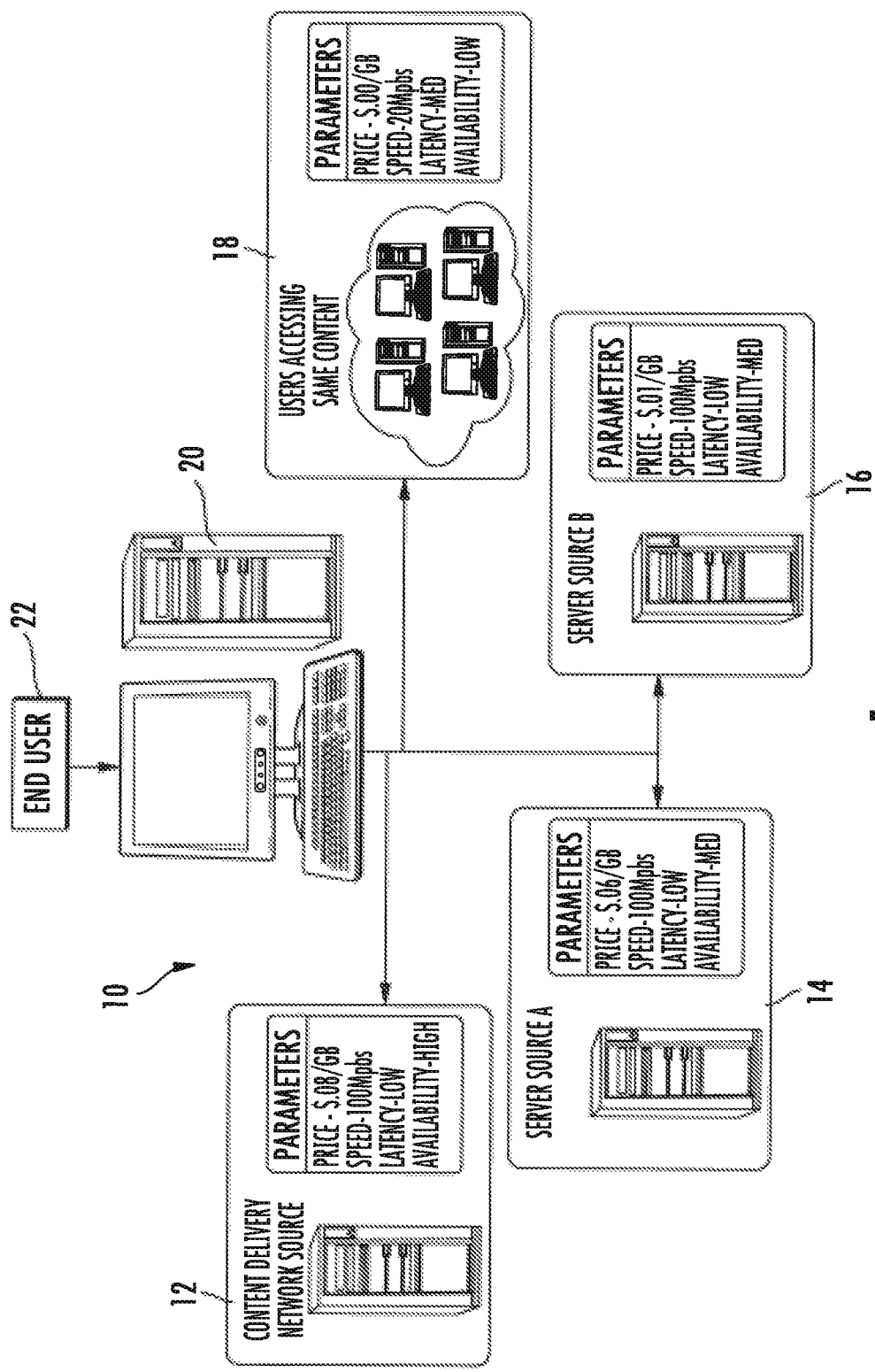
FIG. 1 is an operational diagram for a system providing content to a requestor in accordance with the invention.

A system 10, operating in accordance with the invention, includes two or more sources of video content 12-18. A first source may be, in a preferred non-limiting embodiment, a network source 12, a second source may be a first server source 14, and additional sources may be a second server source 16 or a number of peer users accessing the same content treated collectively as a user source 18.

In this example, a network source 12 is a third party having a number of video content selections, much like a library, at a single domain address. A server source 14 may have a single video content item stored thereon, or a limited number of different video content each individually addressable. Each source 12-18 communicates with a content requestor 20. Content requestor 20 periodically polls each content source, of a preferably known set of content sources 12-18, to determine what content is located at which source. The video content requestor 20 may communicate with each source 12-18, wirelessly, by landline, but preferably over the Internet. Content requestor 20 may be a server, or a computer having a color monitor, keyboard and mouse.

As known in the art, an end user 22 having a computer with a color monitor, keyboard, and mouse communicates with a website operating at content requestor 20. In general, in response to a video content request from end user 22, video content is incrementally loaded from one or more of content sources 12-18 as a function of parameters for which content requestor 20 is optimizing the overall content feed to end user 22 as is described below.

Content requestor 20 divides the video content requested by end user 22 into predefined sized segments corresponding to the components as stored at each of sources 12-18. Each of these segments are stored at two or more of content delivery sources 12-18 prior to being accessed by content requestor 20. Content requestor 20 continuously monitors the characteristics of content being provided by each of content sources 12-18 and makes decisions on each of the predefined segments of the video and determines from which content source 12-18 to load a segment of the overall video content to be presented to end user 22. Depending on the priorities of the content requestor 20 and/or end user 22, content requestor 20 may choose the video content segments as a function of transmission and loading speed, if for example requestor 20 requires more content within a short period of time. However, when sufficient content is available either at end user 22 or at content requestor 20 to provide sufficiently reliable and high quality video content, then content requestor 20 may utilize other characteristics to determine which segments of the overall content shall be supplied by which source 12-18; such as availability or cost.

These decisions are made dynamically, as the video is being streamed to end user 22. In the preferred non-limiting environment, a decision by content requestor 20 regarding selecting a source 12-18 for a particular segment is made based on the availability of the content on a source 12-18, the cost of using a source 12-18, as well as the speed with which the content can be delivered from that source 12-18. Content requestor 20 selects from the sources 12-18 in order to optimize delivery quality as well as keep the video content playing without delay on the video player of end user 22.

Information about each content source 12-18 is known in advance to content requestor 20. The cost of delivery is generally a fixed value which may be updated from time to time at content requestor 20. Additionally, anticipated or the published speeds of each source 12-18 may be known to content requestor 20 in advance. In order to maintain quality, in this preferred but non-limiting example, the system is described to optimize viewer experience. Therefore, reference is now made to FIG. 2 in which a flowchart for a mode of operation for content requestor 20 to select relevant sources is provided. In a step 52, a desired video current buffer time is stored in content requestor 20 as a threshold value for content speed in a preferred non-limiting example. The anticipated buffer time for each source 12-18 is stored in a step 54 in a memory either at content requestor 20, in the cloud (not shown) as known in the art, or at the content source 12-18 itself and is input to content requestor 20. In a step 56, content requestor 20 compares the buffer threshold for each source 12-18, i.e. speed of loading, to the predetermined threshold, and removes those sources which do not meet or exceed the threshold from being potential sources of content segments to end user 22. In this example, the peer to peer source 18 has been removed as being determined to be too slow. This is because its twenty-second buffer threshold is considered too slow as it exceeds the fifteen second or better desired threshold.

In one embodiment, the threshold can be continuously adjusted until a single source is selected in step 56. Additionally, the buffer time of each source 12-18 may be continuously monitored as discussed be low, to change the inputs for the decision made in step 56.

Figure 2:
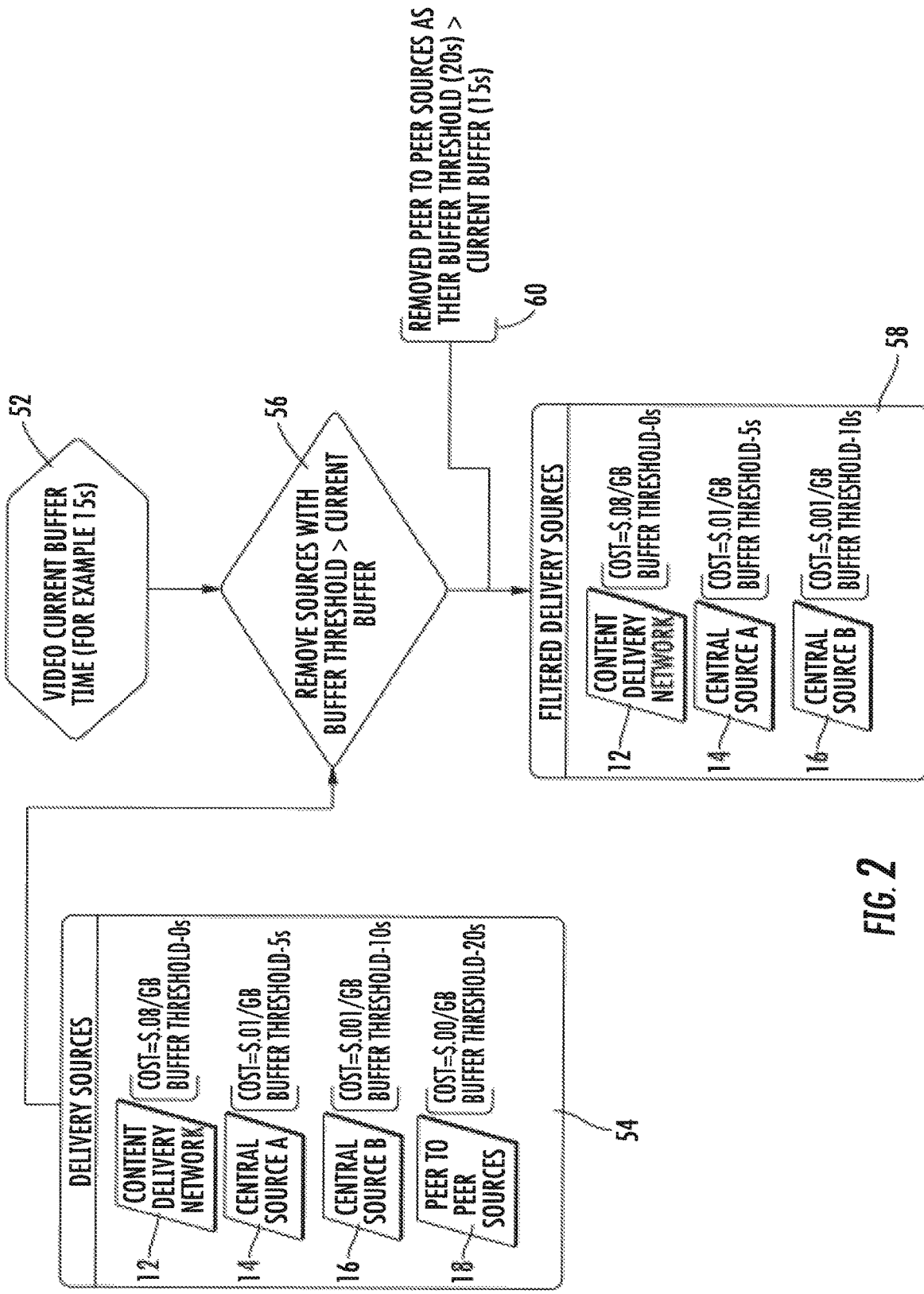
FIG. 2 is a flowchart for providing content from one or more sources to create a video stream as a function of speed of transmission.
Figure 3:
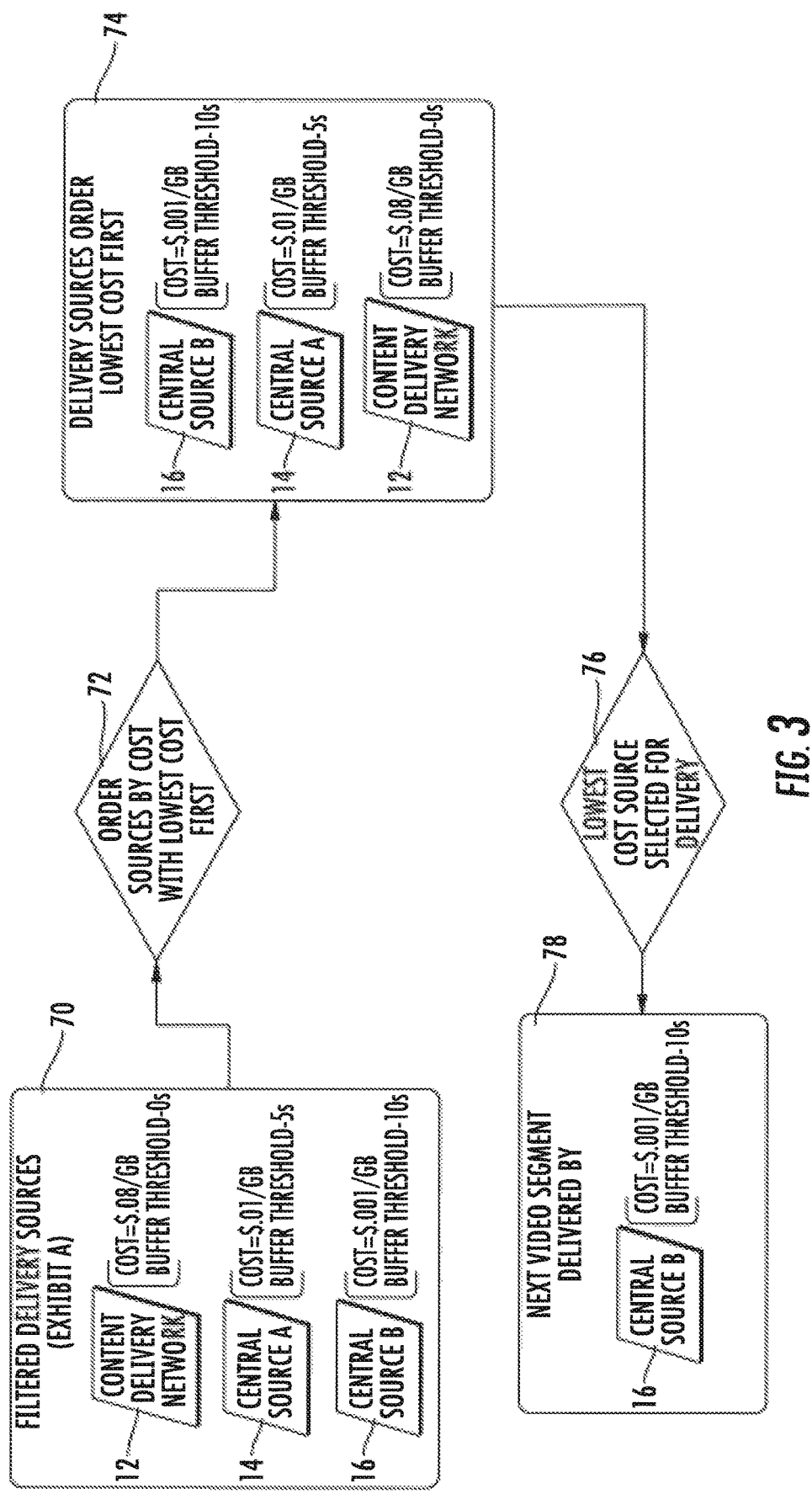
FIG. 3 is a flowchart for providing content from one or more sources to create a video stream as a function of costs.

Furthermore, in a preferred non-limiting embodiment, if two or more sources provide acceptable performance for a first characteristic such as speed as shown in FIG. 2, a second screen may occur for a second characteristic such as cost. Reference is now made to the FIG. 3 in which a method for further limiting the number of sources as a function of cost provided. As seen in this FIG. 3, the three sources 12-16 provided from step 58 is inputs to be filtered in step 70. They are then processed by content requestor 20 in a step 72 to order the sources by cost ranked order to create a table in a step 74. As seen, central source B has the lowest cost per gigabyte for providing content of the group having sufficient buffer time. In a step 76, the lowest cost source is selected for delivery. The next video segment is delivered by content requestor 20 to end user 22 from central source B un a step 78. The process is then repeated for the next segment until the entire content has been provided to end user 22.

In this embodiment, the values for speed as well as relative availability during operation, can change based upon use of a source, the internet itself and other factors. Therefore, content requestor 20 continuously monitors speed of transfer. By monitoring segment size in bytes and transfer speed of sources 12-18, the relative speed of a source is monitored continuously and updated. If a source is known to have a 100 mbps transmit speed, but the end user 22 receives the content at 5 mbps from that source, content requestor 20 will update the information and filter the content source accordingly.

Thus, while there have been shown, described and pointed out novel features of the present invention as applied to the preferred embodiments, it will be understood that the various submissions and substitutions and changes in the form and detail are contemplated to the disclosed invention which may be made by those skilled in the art without departing from the spirit and scope of the invention. It is the intention therefore to be limited only as indicated by the scope of the claims appended hereto. It is also to be understood that the following claims are intended to cover all of the generic and specific features described, and all the statements of the scope of the invention which, as a matter of language, might be said to fall therebetween.

What is claimed as new and desired to be protected by Letters Patent is:

1. A system for optimizing overall transmission of a single video content formed from two or more segments of video content, the segments of video corresponding to two or more components making up the content; comprising:
    a first video content source storing the video content as two or more segments of video content, the two or more segments being combined to form the single video content;
    a second video content source storing the video content as two or more segments of video content, the two or more segments being combined to form the single video content; and
    a content requestor, the content requestor determining which two or more segments corresponding to the video content stored at each of the first video content source and second video content source form the single video content in response to an end user request for the video content, and selecting a source of a segment of video content in response to the end user request to form the video content at an end user computer, selectively transmitting at least one of the two or more segments from at least one of the first video content source and the second video content source to the end user computer as a function of one or more characteristics of transmission of a segment of video content from a selected video content source to the end user, the content requestor periodically polling at least the first video content source and the second video content source, to monitor the segments of video content transmitted by the selected video content source to determine whether a value for a characteristic of the segment of video content has changed; determining, as a function of the value for a characteristic of the transmitted video, whether a next video content source should be changed by comparing the value for the characteristic with a predetermined value, selectively changing the video content source for a next to be transmitted segment of video content when the value of the characteristic of the segment of video content being monitored falls below the predetermined value and continuously adjusting the predetermined value until the value of the characteristic for one of the first video content source or the second video content source is above the adjusted predetermined value, in response to determining that the value for the characteristic is below the predetermined value for both the first video content source and the second video content source.

2. The system of claim 1, wherein the characteristic is a cost of transmitting at least one of two or more segments of video content.

3. The system of claim 1, wherein the characteristic is a buffer time of at least one of two or more segments of video content.

4. The system of claim 1, wherein the content requestor determines whether a second characteristic of the segment of video content has changed during transmission of a first segment of video content to the end user computer, and changing the source of the content segment of video content as a function of the second determination and the first determination.

5. The system of claim 4, wherein the second characteristic is a cost of transmitting at least one of two or more segments of video content.

6. The system of claim 4, wherein the second characteristic is a buffer time of at least one of two or more segments of video content.

7. The system of claim 1, wherein the characteristic is an availability of a video content source.

8. The system of claim 1, wherein the content requestor selects a first segment of content from a first selected video content source, determines that a value for a characteristic of the first segment of video content has changed and in response thereto, selects a second segment of video content from the second video content source and creates the video content from the two or more segments of video content by combining the first segment of content and the second segment of content as the video content.

9. A method for creating video content from two or more segments of video content, the two or more segments of the video content corresponding to two or more components making up the video content, comprising:
   storing the video content as two or more segments of video content at a first video content source, the two or more segments being combined to form the video content;
   storing the video content as two or more segments of video content at least a second video content source, the two or more segments being combined to form the video content;
   determining which two or more segments of video corresponding to the video content stored at the first video content source and second video content source form single video content in response to an end user request;
   selecting a source of a segment of video content in response to the end user request as a function of one or more characteristics of transmission of a segment of video content from a selected video content source;
   causing a first segment of video content to be sent from the selected video content source to an end user;
   monitoring the first segment of video content transmitted from the selected video content source to determine whether a value for a characteristic of a second segment of video content has changed;
   determining whether a next source of video content should be changed by comparing the value for the characteristic with a predetermined value that;
   selectively changing the selected video content source for the second segment of video content to be transmitted when the value for the characteristic falls below the predetermined value; and
   continuously adjusting the predetermined value until the value of the characteristic for the first video content source or the second video content source is above the adjusted predetermined value, in response to determining that the value for the characteristic is below the predetermined value for both the first video content source and the second video content source.

10. The method of claim 9, wherein the characteristic is a cost of transmitting the second segment of video content.

11. The method of claim 9, wherein the characteristic is a buffer time of the second segment of video content.

12. The method of claim 9, wherein the content requestor determines whether a second characteristic of the segment of video content has changed as a second determination and changing a source of the second segment of video content as a function of a second determination and a first determination.

13. The method of claim 12, wherein the second characteristic is a cost of transmitting the segment of video content.

14. The method of claim 12, wherein the second characteristic is a buffer time of the segment of video content.

15. The method of claim 9, wherein the characteristic is an availability of the video content source.

* * * * *